(12) United States Patent
Shah et al.

(10) Patent No.: US 10,933,905 B2
(45) Date of Patent: Mar. 2, 2021

(54) ELECTRIC POWER STEERING SYSTEM WITH UNIFORM ARCHITECTURE FOR MULTIPLE OPERATING MODES

(71) Applicant: Steering Solutions IP Holding Corporation, Saginaw, MI (US)

(72) Inventors: Shrenik P. Shah, Saginaw, MI (US); Chang Wang, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 30 days.

(21) Appl. No.: 16/532,069

(22) Filed: Aug. 5, 2019

(65) Prior Publication Data

US 2019/0359249 A1 Nov. 28, 2019

Related U.S. Application Data

(62) Division of application No. 15/637,267, filed on Jun. 29, 2017, now Pat. No. 10,435,062.

(51) Int. Cl.
*B62D 5/04* (2006.01)
*B62D 6/00* (2006.01)
*B60W 30/045* (2012.01)

(52) U.S. Cl.
CPC .......... *B62D 5/0463* (2013.01); *B62D 5/046* (2013.01); *B62D 5/0457* (2013.01); *B62D 5/0466* (2013.01); *B62D 5/0475* (2013.01); *B60W 30/045* (2013.01); *B62D 5/04* (2013.01); *B62D 5/0472* (2013.01); *B62D 6/00* (2013.01); *B62D 6/002* (2013.01); *B62D 6/003* (2013.01)

(58) Field of Classification Search
CPC .... B62D 5/0463; B62D 5/0457; B62D 5/046; B62D 5/0466; B62D 5/0475; B62D 5/04; B62D 5/0472; B62D 6/00; B62D 6/002; B62D 6/003; B60W 30/045
See application file for complete search history.

(56) References Cited

U.S. PATENT DOCUMENTS

| 5,198,981 | A | 3/1993 | Collier-Hallman et al. |
| 6,013,994 | A * | 1/2000 | Endo ............... B62D 5/0463 318/430 |
| 7,188,701 | B2 | 3/2007 | Patankar |
| 2001/0041957 | A1* | 11/2001 | McCann ............ B62D 6/003 701/41 |
| 2002/0017421 | A1 | 2/2002 | Stevens |
| 2003/0200018 | A1* | 10/2003 | Arimura ........... B62D 5/0457 701/41 |
| 2005/0150711 | A1 | 7/2005 | Burton |
| 2010/0268418 | A1 | 10/2010 | Fernandez |
| 2018/0009469 | A1* | 1/2018 | March ............. B62D 5/0463 |
| 2018/0009472 | A1* | 1/2018 | Sawada ........... B62D 5/0463 |

* cited by examiner

*Primary Examiner* — Behrang Badii
(74) *Attorney, Agent, or Firm* — Dickinson Wright PLLC

(57) ABSTRACT

Technical solutions are described for facilitating an electric power steering (EPS) system for providing a motor torque assist command. An example EPS system includes a first module configured to generate a regulation signal or a tuning signal based on a mode of operation of the EPS system. The EPS system further includes a second module configured to generate a stability signal irrespective of the mode of operation of the EPS system. The EPS system further includes a blending module configured to combine the stability signal with either the regulation signal or the tuning signal to generate an assist motor torque signal for the EPS system.

10 Claims, 9 Drawing Sheets

US 10,933,905 B2

ELECTRIC POWER STEERING SYSTEM WITH UNIFORM ARCHITECTURE FOR MULTIPLE OPERATING MODES

CROSS-REFERENCE TO RELATED APPLICATION

This a divisional application of, and claims priority to, U.S. patent application Ser. No. 15/637,267, filed Jun. 29, 2017, the disclosure of which is incorporated herein in its entirety.

TECHNICAL FIELD

The present application generally relates to electric power steering (EPS) systems, and particularly to EPS systems that operate in multiple operating modes such as position control mode, torque control mode, velocity control mode, and so on.

BACKGROUND

An electric power steering (EPS) system may be operated in various control modes for variety of steering functions and applications. For example, during typical operation of an EPS in a vehicle, the EPS may operate in torque control mode. Additionally, during autonomous driving, or automatic parking or any other such autonomous operations, the EPS may be operated in position control mode. Additionally, during controlled handwheel return operations of the vehicle, the EPS may operate in velocity control mode. In one or more examples, the torque control mode is further classified into two sub-methods. First, an assist-based control where motor torque is provided based on an amount of torque applied by a driver: and second, calculating a reference driver torque and regulating handwheel torque that causes the EPS to achieve a desired torque. Further, steer by wire EPS system use both, the torque control mode and the position control mode.

Transitioning from one operating mode to another during driving the vehicle, thus leads to the EPS, transitioning from one operating mode to another. Typically, the EPS includes a separate module for each operating mode of the EPS. There are considerable variations in the EPS mechanical design in terms of motor inertia, hand wheel inertia, and stiffness in the system.

Accordingly, it is desirable to have objective, and uniform, control architecture of the EPS that operates regardless of the mechanical parameter variations and yet gives consistent results, irrespective of changes in the hardware. Such an objective architecture can lead to improvement of the EPS systems, because once the trade-offs for a particular EPS system are identified, those can directly be applied to another EPS system, reducing system dependent control tuning effort. Further, because the objective architecture works for all modes of operation of the EPS, controlling and tuning of the EPS can be simplified.

SUMMARY

According to one or more embodiments, an electric power steering (EPS) system for providing a motor torque assist command, the power steering system includes a first module configured to generate a regulation signal or a tuning signal based on a mode of operation of the EPS system. The EPS system further includes a second module configured to generate a stability signal irrespective of the mode of operation of the eps system. The EPS system further includes a blending module configured to combine the stability signal with either the regulation signal or the tuning signal to generate an assist motor torque signal for the EPS system.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

The technical solutions described herein provide an electric power steering (EPS) system with a unified control architecture for different EPS control modes including torque control mode, velocity control mode, and position control mode, among others. The technical solutions further provide full state feedback control of position, velocity, and torque using EPS signals without an observer. In addition, the technical solutions facilitate separation of tuning of steering feel with stability control for assist based torque control. The unified architecture facilitates an EPS system to include a regulation/feel tuning section for each of the EPS operating modes, and a common stability section that remains unaltered irrespective of EPS operating mode. The EPS system may further include a state handler that transitions from one EPS operating mode to another based on signals, such as driver hands-on-wheel detection.

Figure 1:
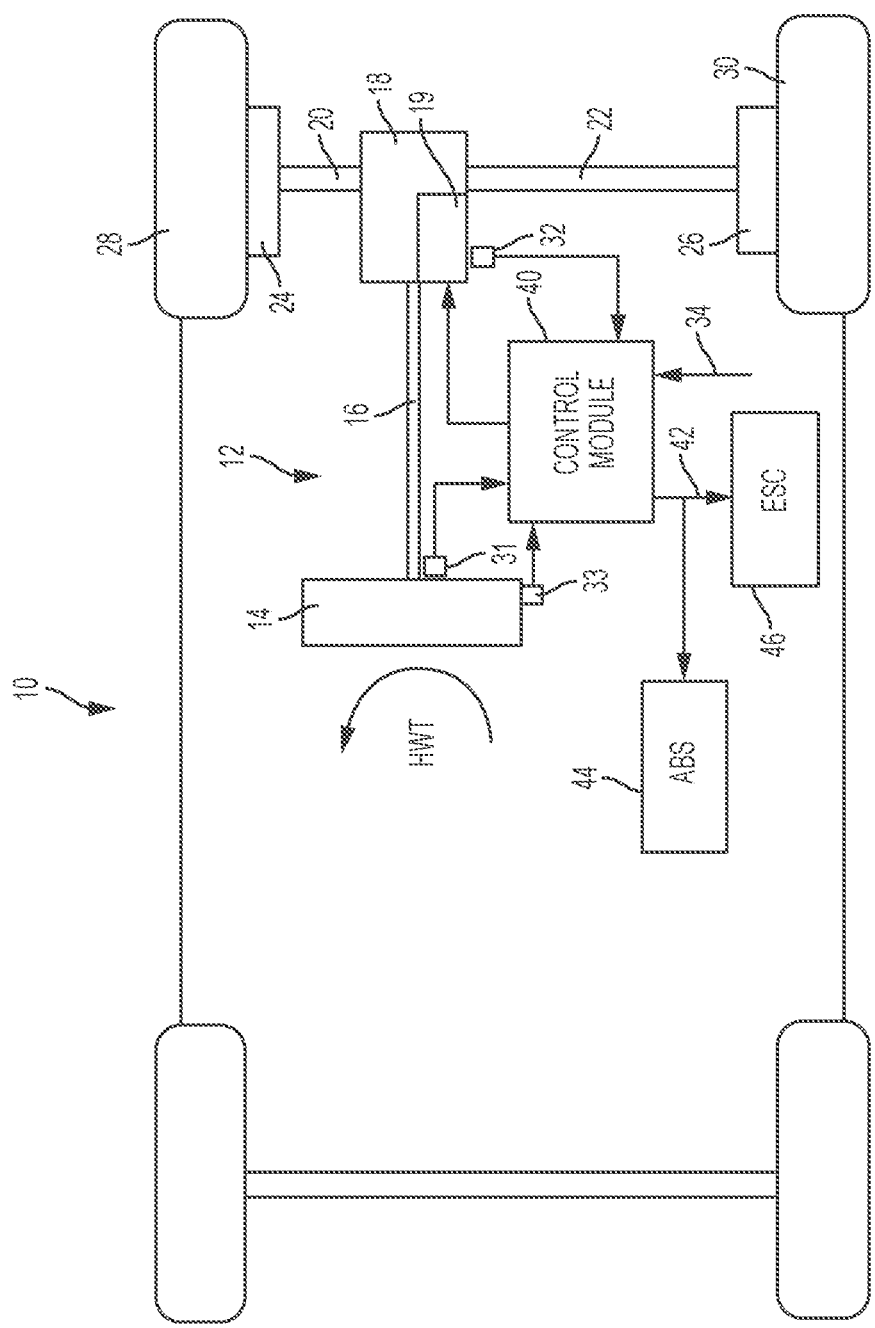
FIG. 1 depicts a schematic diagram of a motor control system in accordance with exemplary embodiments.

Referring now to the Figures, where the technical solutions will be described with reference to specific embodiments, without limiting same, FIG. 1 is an exemplary embodiment of a vehicle 10 including a steering system 12 is illustrated. In various embodiments, the steering system 12 includes a handwheel 14 coupled to a steering shaft system 16 which includes steering column, intermediate shaft, & the necessary joints. In one exemplary embodiment, the steering system 12 is an EPS system that further includes a steering assist unit 18 that couples to the steering shaft system 16 of the steering system 12, and to tie rods 20, 22 of the vehicle 10. Alternatively, steering assist unit 18 may be coupling the upper portion of the steering shaft system 16 with the lower portion of that system. The steering assist unit 18 includes, for example, a rack and pinion steering mechanism (not shown) that may be coupled through the steering shaft system 16 to a steering actuator motor 19 and gearing. During operation, as a vehicle operator turns the handwheel 14, the steering actuator motor 19 provides the assistance to move the tie rods 20, 22 that in turn moves steering knuckles 24, 26, respectively, coupled to roadway wheels 28, 30, respectively of the vehicle 10.

As shown in FIG. 1, the vehicle 10 further includes various sensors 31, 32, 33 that detect and measure observable conditions of the steering system 12 and/or of the vehicle 10. The sensors 31, 32, 33 generate sensor signals based on the observable conditions. In one example, the sensor 31 is a torque sensor that senses an input driver handwheel torque (HWT) applied to the handwheel 14 by the operator of the vehicle 10. The torque sensor generates a driver torque signal based thereon. In another example, the sensor 32 is a motor angle and speed sensor that senses a rotational angle as well as a rotational speed of the steering actuator motor 19. In yet another example, the sensor 32 is a handwheel position sensor that senses a position of the handwheel 14. The sensor 33 generates a handwheel position signal based thereon.

A control module 40 receives the one or more sensor signals input from sensors 31, 32, 33, and may receive other inputs, such as a vehicle speed signal 34. The control module 40 generates a command signal to control the steering actuator motor 19 of the steering system 12 based on one or more of the inputs and further based on the steering control systems and methods of the present disclosure. The steering control systems and methods of the present disclosure apply signal conditioning and perform friction classification to determine a surface friction level 42 as a control signal that can be used to control aspects of the steering system 12 through the steering assist unit 18. The surface friction level 42 can also be sent as an alert to an ABS 44 and/or ESC system 46 indicating a change in surface friction, which may be further classified as an on-center slip (i.e., at lower handwheel angle) or an off-center slip (i.e., at higher handwheel angle) as further described herein. Communication with the ABS 44, ESC system 46, and other systems (not depicted), can be performed using, for example, a controller area network (CAN) bus or other vehicle network known in the art to exchange signals such as the vehicle speed signal 34.

Figure 2:
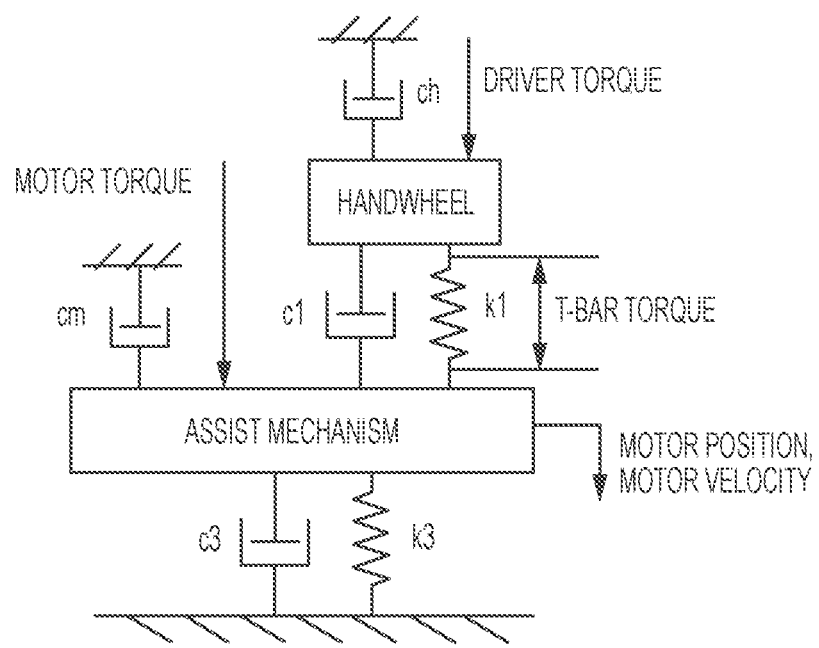
FIG. 2 illustrates an example EPS two-mass linear model.

The EPS 12 can be represented as a linear system model with two inertias Handwheel (HW) and Assist mechanism (AM). Typically, the AM consists of combined motor and rack inertia. FIG. 2 illustrates an example EPS two-mass linear model. Motor torque and driver torque represent the two inputs to the EPS system 12, while T-Bar torque (HWT), motor position ($\theta_m$), and motor velocity ($\omega_m$) represent the three outputs or measurements in the EPS system 12. HWT is the torque across the torsion spring k1. In a two-mass mechanical system, there would be four total states in the system, two each for the two input inertias. The four states of the system are namely, HW position ($\theta_{hw}$), HW velocity ($\omega_{hw}$), AM position ($\theta_{am}$), and AM velocity ($\omega_{am}$).

The physical parameters ($J_{hw}$, $J_{am}$, k1, k3, c1, c3, ch, and cm) of the two-mass model can be either measured or estimated by using frequency response based system identification and collecting data from the EPS gear. The linear equations for the two-mass model of FIG. 2 can be expressed as $$\dot{x} = A_p x + B_p u$$

$$y = C_p x + D_p u \qquad (1)$$

Where x represents the four states of model, y represents the measured outputs, and u represents the inputs to the model.

For example, x, y, and u may be represented as the following vectors.

$$x = [\theta_{hw}; \omega_{hw}; \theta_{am}; \omega_{am}]$$

$$u = [T_d; T_m]; \text{ and}$$

$$y = [HWT; \theta_m; \omega_m]$$

Further, for the two-mass model the matrices $A_p$, $B_p$, $C_p$, and $D_p$ of equation 1 are represented as follows.

$$A_p = \begin{bmatrix} 0 & 1 & 0 & 0; \\ -\frac{k1}{jh} & -\frac{(c1+ch)}{jh} & \frac{k1}{jh} & \frac{c1}{jh}; \\ 0 & 0 & 0 & 1; \\ \frac{k1}{jm} & \frac{c1}{jm} & \frac{-(k1+k3)}{jm} & \frac{-(c1+c3+cm)}{jm} \end{bmatrix}$$

$$B_p = \begin{bmatrix} 0 & 0; \\ \frac{1}{jh} & 0; \\ 0 & 0; \\ 0 & \frac{1}{jm} \end{bmatrix}$$

$$C_p = \begin{bmatrix} k1 & 0 & -k1 & 0; \\ 0 & 0 & 1 & 0; \\ 0 & 0 & 0 & 1 \end{bmatrix}$$

$$D_p = \begin{bmatrix} 0 & 0 & 0 & 0; \\ 0 & 0 & 0 & 0 \end{bmatrix}$$

In one or more examples, the four states of the system are transformed from HW position ($\theta_{hw}$), HW velocity ($\dot{\theta}_{hw}$), AM position ($\theta_{am}$), and AM velocity ($\omega_{am}$) to T-Bar torque (HWT), derivative of T-Bar torque ($d_{HWT}$), AM position ($\theta_{am}$), and AM velocity ($\omega_{am}$). An example transformation matrix T for transforming the original set of states to the new set of states is represented as follows.

$$T = \begin{bmatrix} k1 & 0 & -k1 & 0; \\ 0 & k1 & 0 & -k1; \\ 0 & 0 & 1 & 0; \\ 0 & 0 & 0 & 1 \end{bmatrix}$$

Accordingly, the matrices expressed earlier are transformed as follows (using the transformation matrix T).

$$x_t = [HWT; dHWT; \theta_{am}; \omega_{am}]$$

$$A_{pt} = T * A_p * \text{inverse}(T)$$

$$B_{pt} = T * B_p$$

$$C_{pt} = C_p * \text{inverse}(T)$$

$$D_{pt} = D_p$$

Based on the transformed matrices, the equation 1 can be transformed as follows.

$$\dot{x}_t = A_{pt} x_t + B_{pt} u$$

$$y = C_{pt} x_t + D_{pt} u \qquad (2)$$

Among the newly defined states x, the three states of HWT, $\theta_{am}$, and $\omega_{am}$ are also the measured outputs y. That is the state dHWT (which is the derivative of HWT) as the only state that is not measured in the EPS system 12. Accordingly, the state dHWT being a derivative of the measured state HWT, it can be estimated by derivation of measured values of the state HWT and low pass filtering the derivations to reduce any noise in the estimated signal. By direct measurement of the three states (HWT, $\theta_{am}$, and $\omega_{am}$) and estimation by derivation of the fourth state (dHWT), all of the states of the EPS system 12 can be determined. Thus, the technical solutions described herein, based on the determination of all four states, employ full state feedback control without developing an observer (as all states are known). Thus, the technical solutions simplify the control design, improving the EPS system 12 implementing the technical solutions described herein.

For example, an EPS control architecture that implements the technical solutions described herein can be broadly divided into two sections, first, a regulating/tuning part; and second, a stability part. Further, the architecture may be unified across multiple operating modes of the EPS system 12 such that the stability part of the structure remains identical in all operating modes, while the regulating/tuning part changes based on the operating mode the EPS system 12 is running in. In one or more examples, the control architecture may be part of the control module 40. Alternatively or in addition, the control architecture may be part of the assist module 18. Alternatively or in addition, the control architecture implementing the technical solutions described herein may be part of any other module that may or may not be illustrated in FIG. 1. In one or more examples, the control architecture may be part of the EPS 12 itself.

Figure 3:
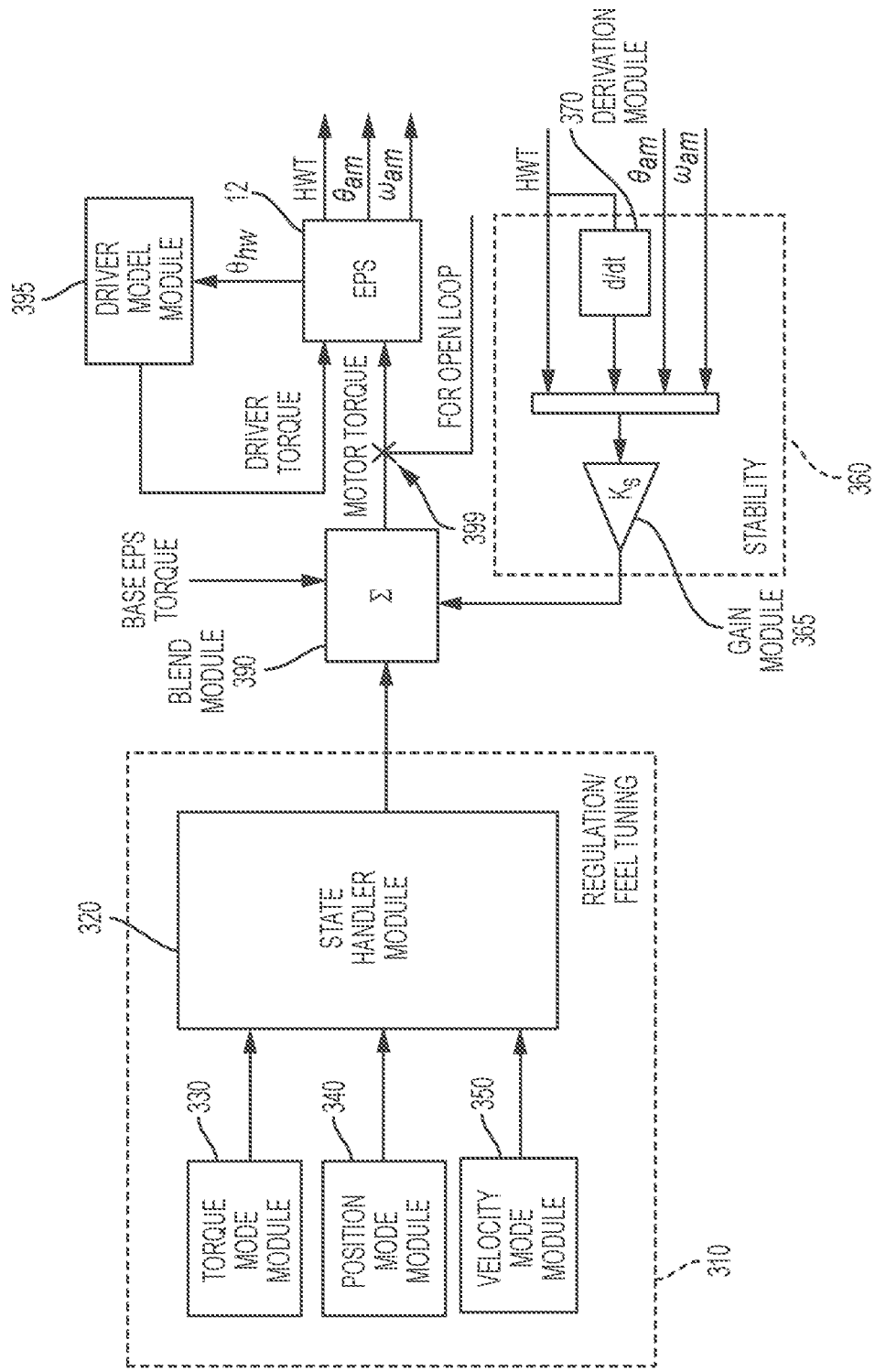
FIG. 3 illustrates an example uniform control architecture that provides a motor torque to an EPS in multiple operating modes of the EPS.

FIG. 3 illustrates an example uniform control architecture that provides a motor torque to the EPS 12 in multiple operating modes of the EPS 12. The control architecture includes, among other components, a regulation-tuning module 310, a stability module 360, and a blend module 390. The regulation-tuning module 310 generates a regulation and/or a tuning signal depending on the operation mode of the EPS 12. The stability module 360 generates a stability signal irrespective of the operating mode. The blend module 390 receives the stability signal and the regulation and/or tuning signal as inputs, and generates the motor torque signal to be sent to the EPS 12.

For example, the driver model module 395 provides the driver torque based on a handwheel position ($\theta_{hw}$) as input. In one or more examples, the driver model module 395 predicts the driver torque based on the actual handwheel position and a desired handwheel position that driver would want the steering to be at during a particular driving maneuver. For example, the driver torque ($T_{dr}$) may be computed (or estimated) according to the following.

$$T_{dr} = K_{dr}(\theta_{des} - \theta_{hw}) + C_{dr}(\omega_{des} - \omega_{hw})$$

Where $K_{dr}$ and $C_{dr}$ represent driver stiffness and driver damping while $\theta_{des}$ and $\omega_{des}$ represent desired driver position and velocity.

The regulating-tuning module 310 generates the regulation and/or the tuning signal that is input to the blend module 390. The regulating-tuning module 310 includes, among other components, a state handler module 320, a torque mode module 330, a position mode module 340, and a velocity mode module 350.

The state handler 320 determines which operating mode the EPS should operate in and handles the transition from one operation mode to another. For example, the state handler 320 determines to transition from one operating mode to another based on signals such as driver's hand on/off steering wheel detect, external commands, and so on. Based on the determined operating mode, the state handler 320 activates at least one of the torque mode module 330, the position mode module 340, and the velocity mode module 350, to generate and output the regulation and/or the tuning signal. Thus, the regulation-tuning module 310 generates and outputs a different regulation/tuning signal based on the operating mode of the EPS. In contrast, the stability module 360 provides the stability signal irrespective of the operating mode.

For example, the state handler module 320 activates the position mode module 340 in case the EPS 12 is operating in position control mode. The position control mode of operation includes the EPS 12 operating according to position commands from the control module 40. For example, the position mode module is used for applications like autonomous driving control, automatic parking, lane assist, or the like.

Figure 4:
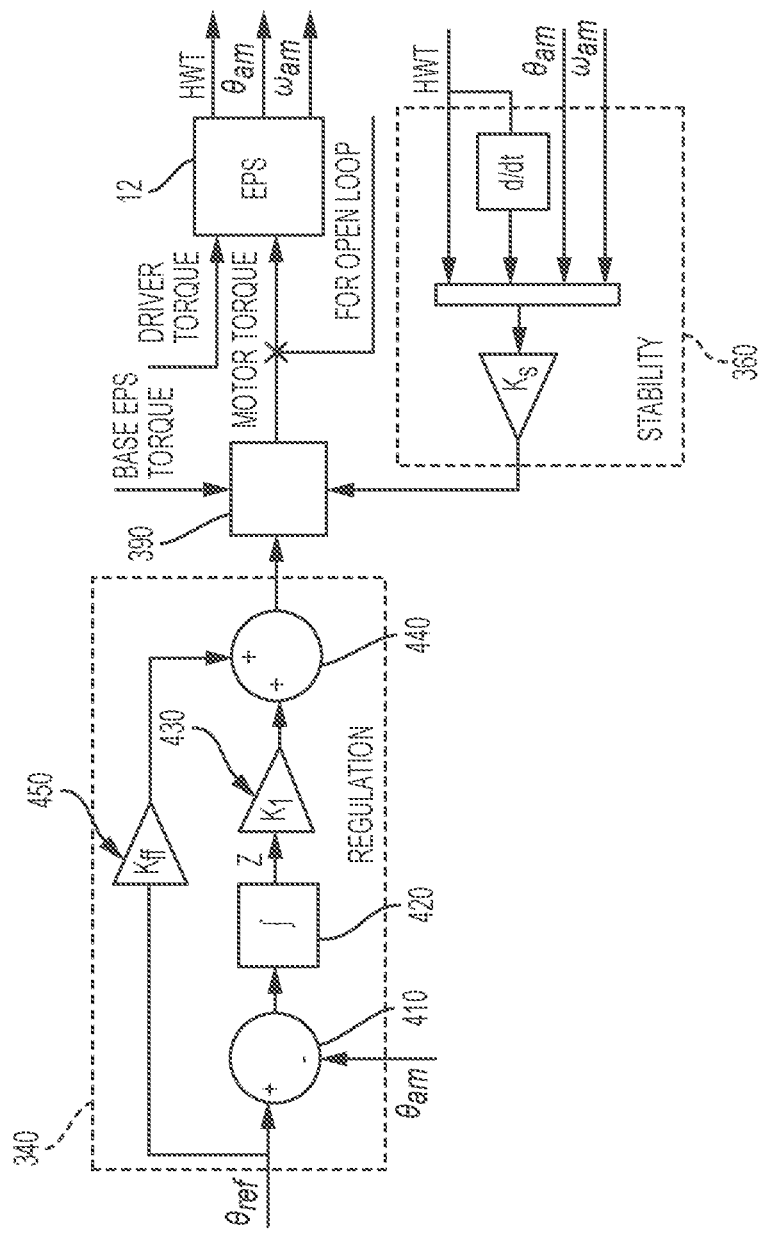
FIG. 4 illustrates example components of a position control mode module.

FIG. 4 illustrates example components of the position mode module 340. As can be seen the illustrated system is a closed loop system. The position mode module 340 includes a subtractor 410, an integrator 420, a gain module 430, a feed-forward gain module 450, and an adder module 440. The position mode module 340 receives $\theta_{ref}$ and $\theta_{am}$ as inputs for generating the regulation signal, which in this case is a position regulation signal ($T_m$). The integrator 420 receives results from the subtractor 410 to generate an integral state (z), where $$\dot{z} = \theta_{ref} - \theta_{am} \qquad (5)$$

Combining equations 2 and 3, we get following equation.

$$\begin{bmatrix} \dot{x}_{pt} \\ \dot{z} \end{bmatrix} = \begin{bmatrix} A_{pt} & 0 \\ -C_{pos} & 0 \end{bmatrix} \begin{bmatrix} x_{pt} \\ z \end{bmatrix} + \begin{bmatrix} B_{ptt} \\ 0 \end{bmatrix} T_m \qquad (4)$$

Where $$B_{ptt} = \left[0; 0; 0; \frac{1}{jm}\right]$$

$$[C_{pos} = [0\ 0\ 1\ 0]]$$

$$A_{eq} = \begin{bmatrix} A_{pt} & 0 \\ -C_{pos} & 0 \end{bmatrix}$$

$$B_{eq} = \begin{bmatrix} B_{ptt} \\ 0 \end{bmatrix}$$

Further, the gain matrix K for generating the position regulation signal $T_m$ is given by $K=[K_s \; K_i]$, and the position mode module 340 generates $T_m$ using feedforward according to the following equation.

$$T_m = -K_s x_{pt} - K_i z + K_{ff} \theta_{ref}$$

Using root locus theory, which facilitates plotting poles of a closed loop transfer function in a complex s-plane as a function of a gain parameter, the gain matrix K is determined for predetermined closed loop pole locations. For example, the gain matrix K is computed by pole placement for the two-mass model with the A matrix represented by the $A_{eq}$ matrix above and the B matrix represented by the $B_{eq}$ matrix above. The closed-loop poles are the positions of the poles (or eigenvalues) of a closed-loop transfer function in the complex plane (s-plane). For example, the gain matrix K is determined such that the eigenvalues of $(A_{eq}-B_{eq}*K)$, which represents the A matrix of closed loop system has the predetermined closed loop pole locations. For example, consider that the predetermined closed loop pole locations are $$pl=[-60+65i,-60-65i,-45+60i,-45-60i,-16]$$

Hence, in this case K is calculated so the Eigen values of (Aeq−Beq*K) are given by pl. Further, once Ks and Ki are calculated based on the predetermined closed loop pole locations, the $K_{ff}$ (feed-forward gain) is tuned to improve performance. In one or more examples, the gains K and $K_{ff}$ are functions of vehicle speed so position control performance can be optimized differently at different vehicle speeds. Further, the tracking bandwidth is controlled by the gains $K_i$ and $K_{ff}$, which are in the regulating-tuning module 310 of the control architecture; while noise, disturbance rejection, and stability properties are controlled by the gain $K_s$, which is in the stability module 360 of the control architecture. The tracking bandwidth is an indicator of the EPS systems' ability to track a reference signal, such as a desired position signal, a desired velocity signal, a desired torque signal, or any other desired performance signal.

In one or more examples, the predetermined eigenvalues for the two-mass EPS closed loop system in position control mode are represented by complex conjugate pole pairs, while the real pole represent eigenvalue of the integrator state (z). The closed loop performance of the two-mass model of the EPS 12 is directly affected by changing the pole locations. For example, decreasing imaginary part of the pole locations results in increased damping in the EPS 12. Alternatively or in addition, increasing imaginary part of pole locations may improve robustness and disturbance rejection properties up to a predetermined threshold. Increasing the imaginary parts above the predetermined threshold may lead to noise that is more audible during operation. The bandwidth of the EPS 12 can be increased by changing $K_i$, which is affected by the real part of the eigenvalue pole location. Thus, theoretically, by predetermining the closed loop poles of the control system represented by the two-mass model of the EPS 12, a desired performance of the system can be achieved.

Accordingly, a direct correlation can be established between the predetermined pole locations, and real world performance and various control metrics, which in turn determine the control gains. The technical solutions using the control architecture thus facilitates an objective way of designing control gains in terms of real world control metrics and performance. Further, when the mechanical hardware of the EPS 12 changes, by updating the open loop system representing the two-mass model of the EPS 12 to reflect the hardware, the gains can be recalculated to achieve substantially the same closed loop pole locations to give similar real world performance as before. Thus, by designing the closed loop pole locations instead of gains directly, the technical solutions herein provide an objective as well as robust way to reduce effect of mechanical/hardware changes.

In one or more examples, the closed loop system for providing the motor torque to the EPS may be broken open at the motor torque being commanded to EPS. For example, FIG. 3 indicates an inspection location 399 to break open the closed loop to read the motor torque values and determine performance of the control architecture that operates using a closed loop system. For example, different sets of predetermined closed loop pole locations may be used to determine corresponding gain values for the closed loop sy390stem. Alternatively or in addition, the inspection location 399 may be used to verify that the closed loop system is performing as designed.

For example, consider an example where two sample pole locations are used and corresponding performance parameters such as frequency (Hz), phase (deg), magnitude (dB) of the EPS 12 are collected and compared. For example, consider that the following sample pole locations are used.

$$pl1=[-60+65i,-60-65i,-45+60i,-45-60i,-16]$$

$$pl2=[-60+35i,-60-35i,-45+30i,-45-30i,-16]$$

The only difference between pl1 and pl2 is that pl2 has lower imaginary parts in pole locations compared to pl1. By plotting the collected parameters corresponding to the respective pole locations, it may be determined that pl1 results in better disturbance rejection properties, such as smoother handwheel movement in position control mode, compared to pl2, for example based on a higher low frequency gain (see FIG. 8A). This may be further verified in the vehicle 10 by using the gains corresponding to both pl1 and pl2 pole locations. Alternatively or in addition, based on the collected parameters, trends may be identified, such as increasing the imaginary part leads to reduction in margins, which leads to vibrations and audible noise in the vehicle 10.

In another example, consider the following two sets of pole locations.

$$pl1=[-60+65i,-60-65i,-45+60i,-45-60i,-16]$$

$$pl2=[-60+65i,-60-65i,-45+60i,-45-60i,-10]$$

The only difference between pl1 and pl2 in these two sets is that the real pole location changes from −16 to −10 (see extreme right). By plotting the collected parameters corresponding to the respective pole locations, it may be determined that a system with gains corresponding to pl2 has lesser bandwidth compared to a system with pole locations pl1. This is indicated in FIG. 8B with increase of settling time and rise time for a system with pl2 compared to a system with pl1. This behavior is also replicated in the vehicle 10.

Similarly, the pole locations directly relate to control attributes in the vehicle 10, such as bandwidth, disturbance rejection, audible noise, and the like. Thus, design of control gains by pole locations as described herein leads to an intuitive control design, which is hardware independent and objective.

Figure 9:
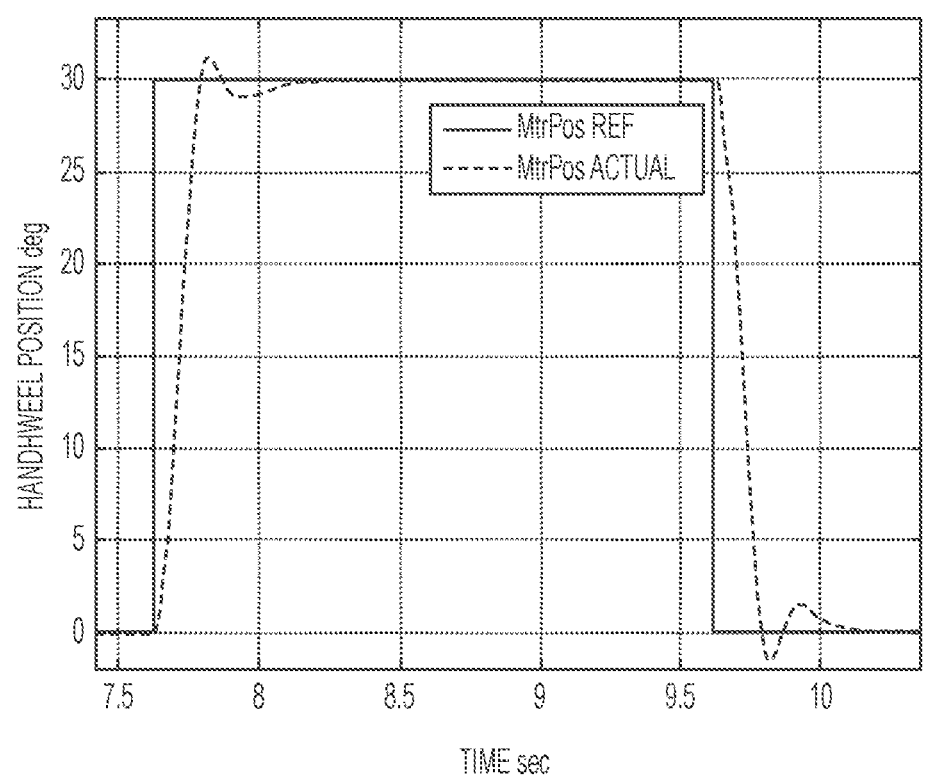
FIG. 9 shows an example step response for an EPS implementing a uniform control architecture described herein.

Further, FIG. 9 shows an example step response data in vehicle 10 when $\theta_{ref}$ changes from 0 to 30 degrees in 2 ms, the overshoot of the response being less than 5%, while the rise time (time to reach 90% of final value) is 0.15 seconds and the 2% settling time is 0.4 seconds. The example plot illustrates that the step performance of the closed-loop system going away from center and coming back to center show similar performance. Because, the tire performance is different depending on turning towards or away from center, the example step response represents disturbance rejection by the position mode module 340 within a predetermined acceptable range.

Further, the position mode module 340 using the uniform architecture as described herein facilitates the hand wheel to provide a response that is smooth and not jagged in response to $\theta_{ref}$ following a sine command with frequency 0.1 Hz and amplitude 60 degrees. Thus, the EPS 12, using the uniform control architecture described herein, provides a low frequency sinusoidal response within predetermined acceptable range. Additionally, when $\theta_{ref}$ follows a sine command with frequency 1 Hz and amplitude 60 degrees, the EPS 12 tracks the angle appropriately, that is within a predetermined acceptable range. Thus, the EPS 12, using the uniform control architecture described herein, provides a medium frequency sinusoidal response within the predetermined acceptable range. In addition, when $\theta_{ref}$ follows a sine command with frequency 3.5 Hz and amplitude 30 degrees, by definition of bandwidth (−3 db point on closed loop bode plot or frequency at which output magnitude is 0.707 times the command) the bandwidth of the EPS 12 is within predetermined acceptable limits of 3.5 Hz. Thus, the EPS 12, using the uniform control architecture described herein, provides a high frequency sinusoidal response within predetermined acceptable range.

As described earlier, the blend module 390 generates the motor torque command based on the regulation signal from the position mode module 340. In one or more examples, the blend module 390, receives additional base EPS torque signal(s) that the blend module 390 uses to generate the motor torque. In one or more examples, the blend module 390 receives the base EPS torque signals from one or more base EPS functions. For example, the base EPS functions include but are not limited to assist, return, damping, and the like. The base EPS functions may be active when the EPS 12 is under position control and hence the base EPS command may act as a disturbance for the position mode module 340 in position control mode of operation. In one or more examples, the blend module 390 may sum the input signals to generate the motor torque provided to the EPS 12.

For example, an assist function includes an assist gain as a function of the handwheel torque and vehicle speed, where the assist gain is multiplied with the handwheel torque to generate the assist command. Such a gain from handwheel torque to generate the motor torque command is not considered while designing the state feedback gain matrix for position control. Accordingly, the closed loop system performs per different closed loop pole locations from those desired (and designed) for state feedback gains (Ks and Ki) in the position mode module 340. Thus, the performance of the closed-loop system is not according to the closed loop pole locations designed, for example the pl1 and pl2 described earlier. Similarly, a damping function has an unaccounted gain on motor velocity, and a return function has an unaccounted gain on motor position.

Accordingly, to achieve the desired closed loop pole locations the gains for HWT, motor position, and motor velocity in the matrix Ks respectively are adjusted taking into account the values for the base EPS function gains. In one or more examples, the adjustment the adjustments are determined dynamically. For example, the base EPS gains are used as inputs to continuously modify the state gains (Ks and Ki) as the base EPS gains change, and thus maintaining closed loop pole locations to provide the regulation signal in the position control mode. Thus, the position mode module 340 of the uniform control architecture dynamically accounts for the base EPS disturbance(s) and modifies control gains (Ki and Ks) accordingly to facilitate the EPS 12 to perform according to acceptable thresholds in the position control mode. Without such dynamic modification, the typical solution is to switch the base EPS command(s) off completely (as they cause the disturbance) to get the acceptable performance from the EPS 12 during the position control operating mode.

Figure 5:
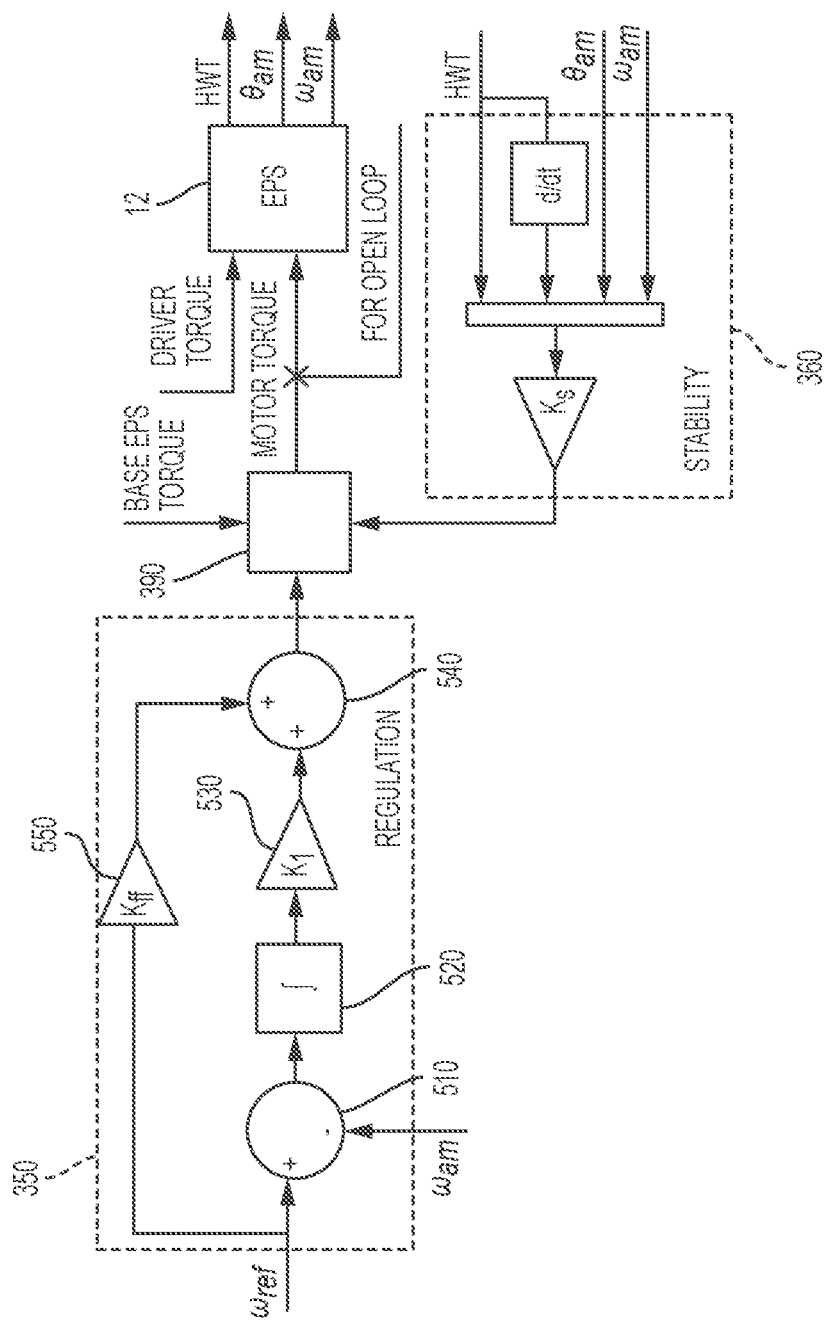
FIG. 5 illustrates example components of a velocity control mode module.

FIG. 5 illustrates example components of the velocity mode module 350. As can be seen the illustrated system is a closed loop system. The velocity mode module 350 is used during the velocity mode of operation, in which the EPS 12 follows a specific velocity command. For example, the velocity mode module 350 is used for regulating the return velocity of the steering wheel when the steering returns back to center. For example, return facilitates that the steering wheel returns back to center when, a driver leaves the steering wheel at a non-zero angle. In this regard, the EPS 12 experiences tire return forces that ensure that the steering wheel comes back to center from the non-zero angle. The tire return forces vary as a function of vehicle speed. Hence, the natural return performance changes with vehicle speed. A controlled return facilitates the EPS 12 to return to the center at a predetermined velocity, independent of the vehicle speed, and ensuring that the steering wheel returns to a zero (center) location. Facilitating such a controlled return includes regulating the motor velocity, which the velocity mode module 350 does as described further.

By comparing FIG. 5 and FIG. 4, it is seen that the regulation part of the common architecture of the closed-loop system changed, by replacing the position mode module 340 in FIG. 4 with the velocity mode module 350 in FIG. 5, and the stability part of the architecture remains same. For example, the velocity mode module 350 includes a subtractor 510, an integrator 520, a gain module 530, a feed-forward gain module 550, and an adder module 540 (which are similar to the components of the position mode module 340 in FIG. 4). Further, the changes in the regulation part include commanding a velocity ($\omega_{ref}$) instead of position ($\theta_{ref}$), calculating a velocity error, and integrating it as Z (instead of position error in FIG. 4). Thus, the equation 3 for the closed-loop system of FIG. 4 is redefined as equation 5 below for the closed-loop system of FIG. 5.

$$\dot{z} = \omega_{ref} - \omega_{am} \quad (5)$$

Similar to calculating the gains for the position mode (see equation 4), in the velocity mode, the gains (Ks and Ki) can be calculated by replacing the $C_{pos}$ matrix with $C_{vel}$ matrix as shown below.

$$C_{vel} = [0\ 0\ 0\ 1]$$

Further, similar to the position mode module 340, the velocity mode module 350 generates a regulation signal $T_m$ using feedforward according to the following equation.

$$T_m = -K_s x_{pt} - K_i z + K_{ff} \omega_{ref}$$

Further, similar to the position mode, pole locations are determined for the velocity mode of operation. The pole locations used for regulating the return velocity of the steering wheel can be different from those used for controlling position of the steering wheel. That is the set of gains ($K_s$, $K_i$, and $K_{ff}$) are different for the position and velocity operating modes, and yet the control architecture is uniform (as illustrated in FIGS. 4 and 5). Because the architecture remains uniform, the metrics used for the position operating mode can also be defined for the velocity operating mode. Further, the benefits of the architecture of the closed-loop system of the position mode module 340 such as intuitiveness, objectivity, robustness to hardware changes, and isolation of stability and regulation are carried over to the velocity mode module 350 as well.

Further, as discussed with regards to the position mode module 340, the base EPS command may be active in the velocity operating mode, causing a disturbance for the velocity control regulation signal generated by the velocity mode module 350. In order to maintain the closed loop pole locations, the state feedback gain matrix (Ks and Ki) are adjusted by accounting for the base EPS gains as described herein, with respect to the position mode module 340.

The torque mode module 330 is used in the torque control operating mode, when the driver is controlling the steering wheel. In one or more examples, there are two different torque control operations. For example, in a reference torque based control, a predetermined torque that driver should feel is calculated to regulate handwheel torque to achieve the predetermined torque level. In an assist based torque control, the motor torque is calculated based on the amount of handwheel torque, which is indicative of an amount of effort applied by the driver on the steering wheel. In one or more examples, other EPS functions like the return and the damping functions are further used to calculate the final motor torque command.

Figure 6:
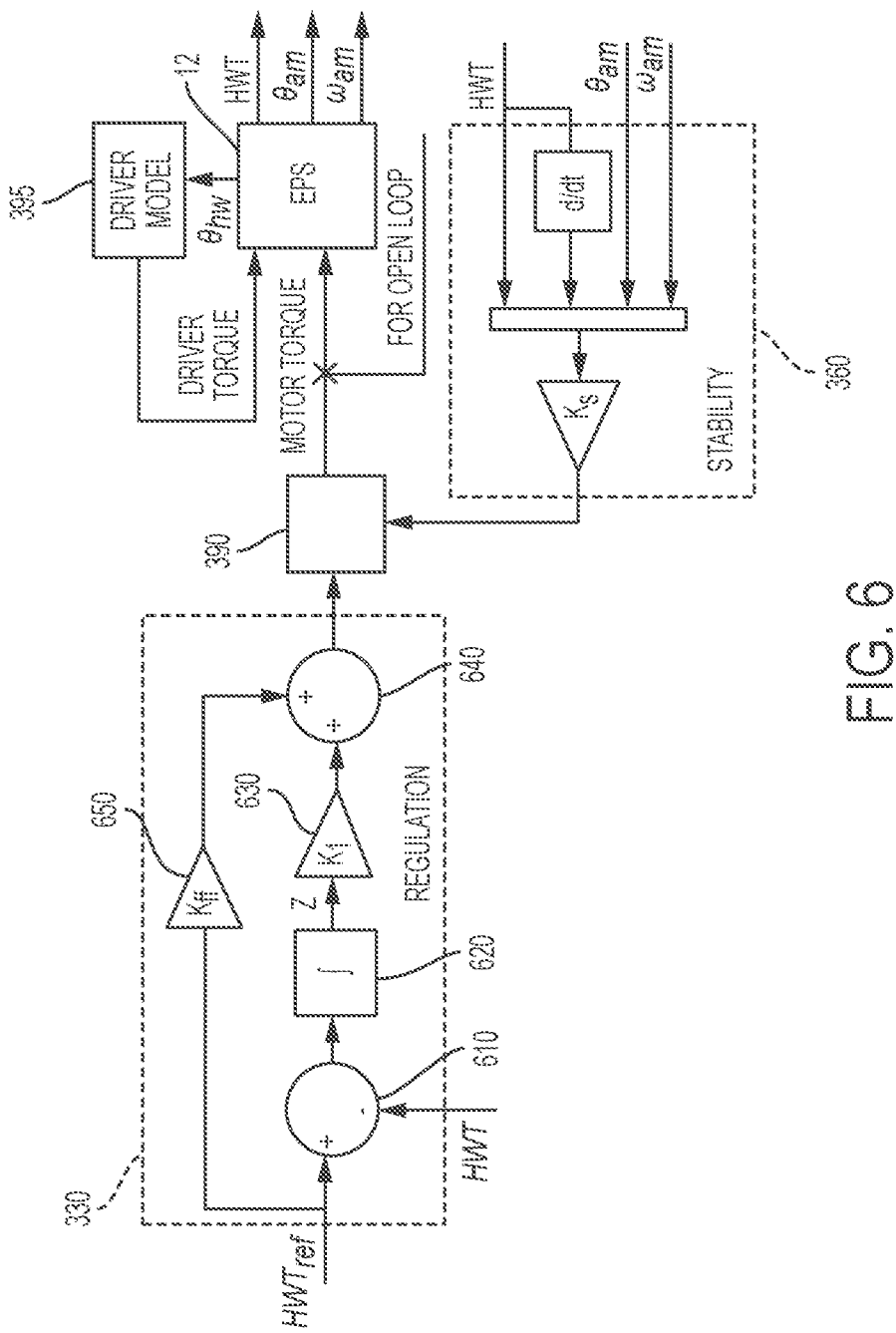
FIG. 6 illustrates example components of a torque control mode module.

FIG. 6 illustrates example components of the torque mode module 330, which provides the regulation signal in reference torque control mode. As can be seen the illustrated system is a closed loop system. Again, comparing FIG. 6 with FIGS. 4 and 5, it is seen that the regulation part of the common architecture of the closed-loop system changed, by using the torque mode module 330 in FIG. 6, and the stability module 360 of the architecture remains same. For example, the torque mode module 330 includes a subtractor 610, an integrator 620, a gain module 630, a feed-forward gain module 650, and an adder module 640 (which are similar to the components of the position mode module 340 in FIG. 4, and the velocity mode module 350 in FIG. 5). Further, the changes in the regulation part include commanding a Handwheel torque ($HWT_{ref}$) instead of position ($\theta_{ref}$) and calculating the HWT error and integrating it as Z (instead of position error in FIG. 4, or velocity error in FIG. 5). Thus, the equation 3 for the closed-loop system of FIG. 4 is redefined as equation 6 below for the closed-loop system of FIG. 6.

$$\dot{z} = HWT_{ref} - HWT \qquad (6)$$

In one or more examples, an acceptable predetermined performance for the EPS 12 is for a plant transfer function from motor torque to handwheel torque to have a zero at origin. In other words, the acceptable predetermined performance for the EPS 12, is that regardless of an amount of motor toque being applied at steady state, the handwheel torque value remains zero as long as there is no driver torque. Accordingly, to analyze and determine the control gains (Ki and Ks) for the reference torque control, the driver model 395 is used to eliminate the zero at the origin. The driver model 395 provides the driver torque as shown in the FIG. 6 and takes in handwheel position ($\theta_{hw}$) as input. The driver model 395 predicts the driver torque based on the actual handwheel position ($\theta_{hw}$) and an estimated, desired handwheel position that a driver would want the steering to be at during a driving maneuver.

For example, Equation 7 represents an equation for the driver model 395, where $K_{dr}$ and $C_{dr}$ represent driver stiffness and driver damping, respectively, and $\theta_{des}$ and $\omega_{des}$ represent desired driver position and velocity, respectively.

$$T_{dr} = K_{dr}(\theta_{des} - \theta_{hw}) + C_{dr}(\omega_{des} - \omega_{hw}) \qquad (7)$$

Because of the addition of a non-zero component from the driver model 395, the definition of the closed-loop system, and accordingly the $A_p$ matrix can be represented as the matrix $A_{pdrv}$, below. The $A_{pdrv}$ matrix also undergoes transformation to redefine the states similar to those described herein for the matrix $A_p$. The transformed matrix $A_{pdrvt}$ is illustrated below.

$$A_{pdvr} = \begin{bmatrix} 0 & 1 & 0 & 0; \\ -\frac{(k1+k_{dr})}{jh} & -\frac{(c1+ch+c_{dr})}{jh} & \frac{k1}{jh} & \frac{c1}{jh}; \\ 0 & 0 & 0 & 1; \\ \frac{k1}{jm} & \frac{c1}{jm} & \frac{-(k1+k3)}{jm} & \frac{-(c1+c3+cm)}{jm} \end{bmatrix}$$

$$A_{pdrvt} = T * A_{pdvr} * \text{inverse}(T)$$

It is to be noted that in case of the matrix $A_p$, the driver model components are not represented because, the driver may not be applying any torque to the steering wheel, such as in position mode, where the controller 40 controls the steering wheel, not the driver. Alternatively or in addition, in the velocity mode, the steering wheel is returning to the center after the maneuver, and thus, driver torque may be absent.

Thus, in the model of the system, represented by equation 4, the matrix $A_{pt}$ is replaced by $A_{pdrvt}$, and $C_{pos}$ by $C_{hwt}$ matrix, which is shown below.

$$C_{hwt} = [1\ 0\ 0\ 0]$$

Thus, similar to the position mode module 340, and the velocity mode module 350, the torque mode module 330 generates a regulation signal $T_m$ using feedforward according to the following equation.

$$T_m = -K_s x_{pt} - K_i z + K_{ff} HWT_{ref}$$

Similarly to the other control modes, the control gains (Ks and Ki) are calculated depending on desired closed loop pole locations for reference torque control. For example, closed loop pole locations can be as follows.

$$pl = [-120+80i, -120-80i, -7+25i, -7-25i, -40]$$

Also, $K_{ff}$ can be selected based on a predetermined bandwidth for the loop. As described herein the complex conjugate pole pairs represent the Eigen values for the two-mass EPS closed loop system (FIG. 2). For the pole locations in the reference torque control mode, the real part of a complex conjugate pole represents an Eigen value of the integrator state. In one or more examples, the EPS 12 uses predetermined closed loop pole locations that correlate directly with EPS closed loop performance in the reference torque control mode. For example, an increase in the integral state Eigen value increases bandwidth of the closed loop. The bandwidth is an indicator of the two-mass systems' ability to track a reference signal, in this case a desired torque signal.

For example, one of the complex conjugate pole pair (consider, −7+25i and −7−25i) can be used to adjust a level of damping in the EPS 12. For example, increase in the magnitude of real part (decrease value of real part) of the pole or reduction in the imaginary part of the pole increases damping in the steering feel and vice versa. The complex conjugate pole pair can also be used to cancel driver impedance zeros caused by the driver trying to steer the vehicle, and thus enhancing steering feel. Thus, the selection of the pole locations have a direct and objective effect on the closed loop performance of the two-mass EPS system, for example by direct manipulation of driver feel in reference torque control mode.

Further, as described herein, the imaginary part of the complex conjugate pole pairs can be used to increase disturbance rejection properties of the closed loop system. Thus, the ability to select the closed loop poles of the control system facilitates achieving a desired performance from the EPS system. Thus, the technical solutions described herein facilitate a designer/manufacturer of an EPS system, or of a vehicle, with a design space that can be used to achieve the desired performance from the EPS system (and/or the vehicle).

Accordingly, the technical solutions described herein facilitate providing an EPS system with a uniform control architecture for operating in position control, velocity control, and reference torque control modes, where the uniform architecture uses a common stability module 360, with interchanging modules for each of the operating modules, such as the position mode module 340, the velocity mode module 350, and the torque mode module 330. The EPS system facilitates the uniform control architecture by modeling the EPS system as a closed-loop two-mass system. The EPS system using the technical solutions further facilitates configuring performance parameters of the EPS by configuring complex pole locations of the closed loop system.

Figure 7:
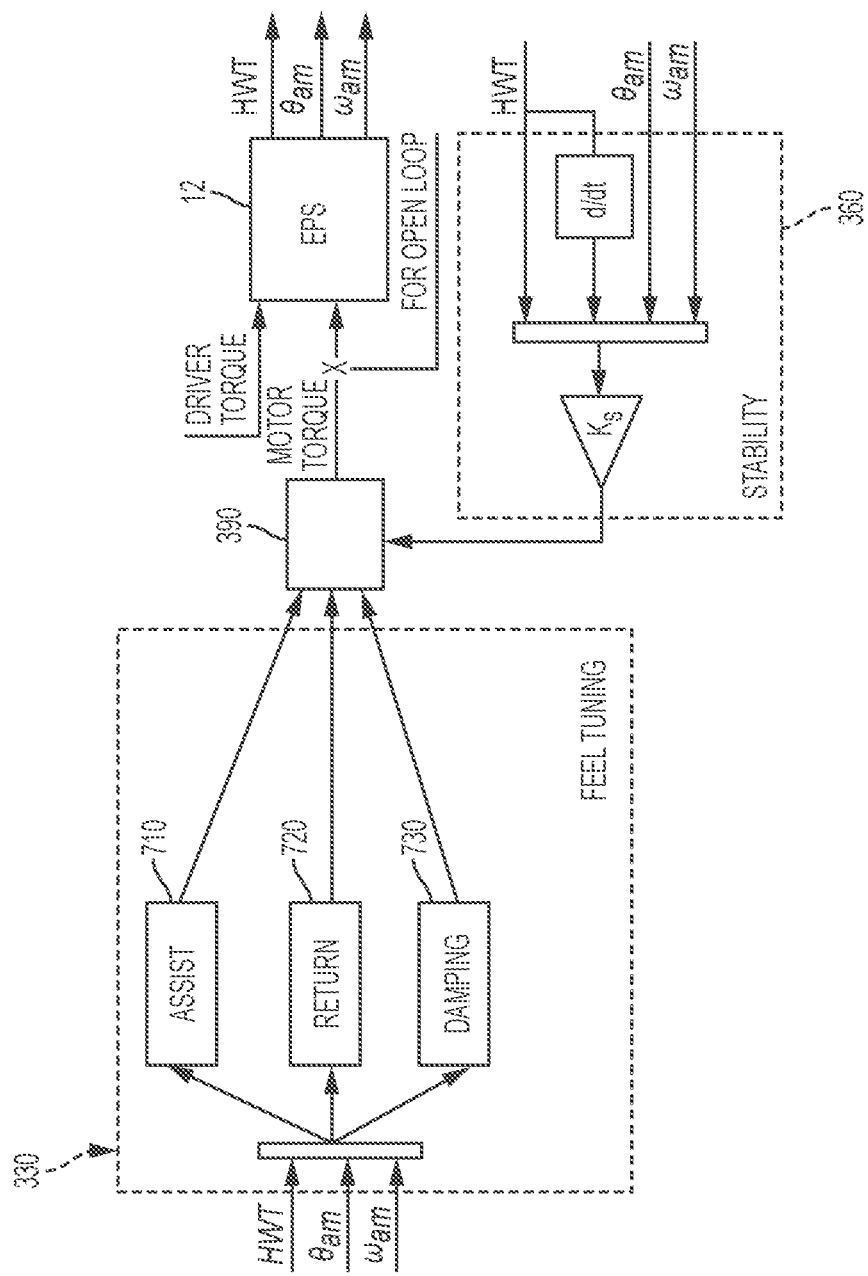
FIG. 7 illustrates example components of a torque mode module for providing an assist based torque control.

Further, in assist based torque control, where the motor torque or in other words the amount of assist provided to the driver is computed based on the measured handwheel torque, the motor torque command is determined based on EPS functions like assist, return, hysteresis, damping, friction compensation, and so on. Typically, stability compensation filters ensure that the EPS system is stable in closed loop. However, to use the uniform control architecture described herein, the technical solutions described herein provide assist based torque control using an architecture as shown in FIG. 7. As illustrated, the control architecture separates the feel tuning components of the EPS control architecture and the stability components of EPS control architecture.

For example, in the modified architecture shown in FIG. 7, the performance, and behavior of the closed loop system can be modified by changing the existing Eigen values of the EPS system by using state feedback (Ks in the stability module 360). The feel tuning can be adjusted by the modifying base EPS functions like assist, return damping, and so on. The stability of the closed loop EPS can be assessed by breaking the loop at motor torque command, as described earlier herein.

As illustrated in FIG. 7, the in assist torque mode, the torque mode module includes the example components of an assist module, a return module, a damping module, or any other such EPS function module. Compared with the modules from FIG. 4, FIG. 5, and FIG. 6, the control architecture in the assist torque mode does not include an integral state (such as integrator 620). Accordingly, in this architecture, equation 4 to calculate the feedback gains, without the integral state can be expressed as follows.

$$[\dot{x}_{pt}] = [A_{pt}][x_{pt}] + [B_{pt}]T_m \quad (8)$$

In this case, because of the absence of the control gain $K_i$, only the control gain $K_s$ is calculated. For example, the gain $K_s$ is computed as described earlier, based on the predetermined pole locations for the EPS 12, such as an example set of pole location with four pole locations as shown below.

$$pl = [-120+80i, -120-80i, -7+25i, -7-25i]$$

It is understood that the pole locations listed herein are just examples, and that different predetermined pole locations may be used according to desired performance of the EPS 12.

Thus, the technical solutions described herein facilitate a unified EPS control architecture for different EPS operating modes such as torque control mode, velocity control mode, and position control mode. The technical solutions further facilitate full state feedback control of position, velocity, and torque using EPS signals without the observer. Further yet, the technical solutions separate computing a signal for a tuning of steering feel from computing a signal for stability control for assist based torque control operating mode. The technical solutions facilitate a controller, or a state handler to transition from one EPS operating mode to another based on signals, such as driver hands-on-wheel detection. The signals may be received from one or more sensors used in the vehicle or in the EPS system. The technical solutions described herein facilitate a uniform control architecture by separating a regulation/feel tuning module for each of the EPS operating modes, while maintaining a stability module that remains unaltered irrespective of EPS operating mode.

The technical solutions further facilitate configuring performance of the EPS using the uniform control architecture using closed loop pole locations. The closed loop pole locations include complex conjugate pole pairs that represent desired performance parameters, which are setup according to Eigen values for a two-mass EPS closed loop system. The real pole in the complex conjugate pair represents an integrator state for generating the regulation signal. The pole locations are used to determine gain matrices, $K_i$ and $K_s$ for the different operating modes. In addition, the EPS uses feedforward gain matrix $K_{ff}$ for further improving performance, where the $K_{ff}$ used may vary for each operating mode. In one or more examples, correlation between the pole locations and the performance/control metrics of the EPS facilitates increasing damping in the EPS system by reducing imaginary part of the pole locations. Additionally, or alternatively, robustness and disturbance rejection of the EPS is improved by increasing imaginary part of the pole locations. In some cases, increasing the imaginary part may cause audible noise. Further yet, by reducing real Eigen value pole locations to change $K_i$, the EPS may increase tracking bandwidth.

Thus, the technical solutions described herein facilitate an EPS system to control torque, position, and/or velocity of the handwheel of the EPS system using a uniform control architecture that separates the stability control from regulation/tuning control. The EPS system using the technical solutions uses the uniform architecture regardless of the operating mode, such as velocity mode, torque mode, and position mode. The EPS system using the uniform architecture described herein complies with acceptable predetermined frequency and bandwidth parameters based on the configuration of closed loop pole locations. The closed loop pole locations cause the EPS system to use corresponding gain matrices ($K_i$ and $K_s$). Accordingly, the EPS system facilitates operating in autonomous, semi-autonomous, as well as manual (non-autonomous) modes.

Figure 8A:
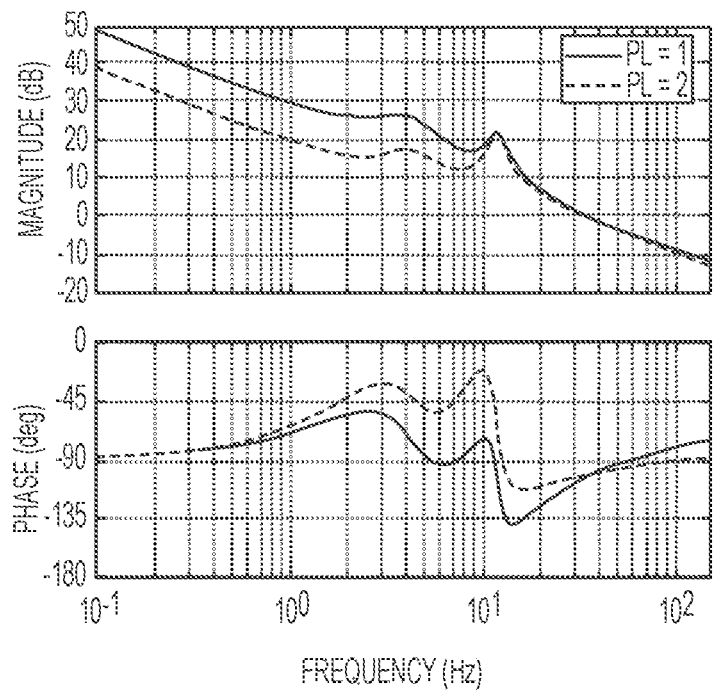
FIG. 8A illustrates example disturbance rejection performance of an EPS implementing a uniform control architecture described herein.
Figure 8B:
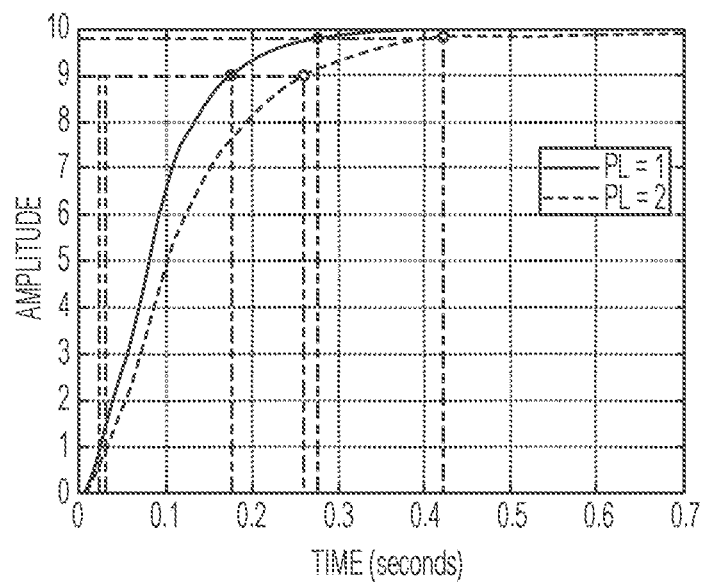
FIG. 8B illustrates example of tracking bandwidth performance of an EPS implementing a uniform control architecture described herein.

FIGS. 8A, 8B, and 9, illustrate example performance of an EPS that implements the uniform control architecture described herein. The example performance is determined by capturing the performance parameters of the EPS by opening the loop prior to the motor torque command being input to the EPS. It is understood that while the illustrated performance is based on performance parameters captured in position control mode, similar performance visualizations can be generated for the other modes of operation.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession, in fact, may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

While the technical solutions are described in detail in connection with only a limited number of embodiments, it should be readily understood that the technical solutions are not limited to such disclosed embodiments. Rather, the technical solutions can be modified to incorporate any number of variations, alterations, substitutions, or equivalent arrangements not heretofore described, but which are commensurate with the spirit and scope of the technical solutions. Additionally, while various embodiments of the technical solutions have been described, it is to be understood that aspects of the technical solutions may include only some of the described embodiments. Accordingly, the technical solutions are not to be seen as limited by the foregoing description.

Having thus described the invention, it is claimed:

1. An electric power steering (EPS) system for providing a motor torque assist command, the EPS system comprising:
   a first module configured to generate a regulation signal or a tuning signal based on a mode of operation of the EPS system;
   a second module configured to generate a stability signal irrespective of the mode of operation of the EPS system; and
   a blending module configured to combine the stability signal with either the regulation signal or the tuning signal to generate an assist motor torque signal for the EPS system.

2. The electric power steering (EPS) system of claim 1, wherein the mode of operation of the EPS system is one from a group consisting of a position control mode, a torque control mode, and a velocity control mode.

3. The electric power steering (EPS) system of claim 1, wherein the second module generates the stability signal based on handwheel torque, assist motor position, and assist motor velocity.

4. The electric power steering (EPS) system of claim 1, wherein the first module further comprises:
   a torque control mode module;
   a velocity control mode module;
   a position control mode module; and
   a state handler module that, based on the mode of operation, activates at least one of the torque control mode module, the velocity control mode module, and the position control mode module.

5. The electric power steering (EPS) system of claim 4, wherein the velocity control mode module generates the regulation signal based on assist motor velocity and reference motor velocity.

6. The electric power steering (EPS) system of claim 4, wherein the position control mode module generates the regulation signal based on assist motor position and reference motor position.

7. The electric power steering (EPS) system of claim 4, wherein the torque control mode module is a reference torque based module that generates the regulation signal based on a handwheel torque signal and reference handwheel torque signal.

8. The electric power steering (EPS) system of claim 4, wherein the torque control mode module is an assist based module that generates the tuning signal based on a handwheel torque signal, an assist motor position signal, and an assist motor velocity signal.

9. The electric power steering (EPS) system of claim 4, wherein each of the torque control mode module, the velocity control mode module, and the position control mode module have a uniform architecture.

10. The electric power steering (EPS) system of claim 9, wherein the uniform architecture comprises an integrator, a control gain component, and a feedforward gain component.

* * * * *